United States Patent
Mukund et al.

(10) Patent No.: US 10,715,633 B2
(45) Date of Patent: Jul. 14, 2020

(54) MAINTAINING REACHABILITY OF APPS MOVING BETWEEN FOG AND CLOUD USING DUPLICATE ENDPOINT IDENTIFIERS

(71) Applicant: Cisco Technology, Inc., San Jose, CA (US)

(72) Inventors: Laxmi Mukund, Bangalore (IN); Victor M. Moreno, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 15/867,273

(22) Filed: Jan. 10, 2018

(65) Prior Publication Data
US 2019/0215381 A1     Jul. 11, 2019

(51) Int. Cl.
*H04L 29/08*     (2006.01)
*H04L 29/12*     (2006.01)
(Continued)

(52) U.S. Cl.
CPC ........ *H04L 67/327* (2013.01); *H04L 43/0876* (2013.01); *H04L 61/2084* (2013.01);
(Continued)

(58) Field of Classification Search
None
See application file for complete search history.

(56) References Cited

U.S. PATENT DOCUMENTS

2013/0212212 A1    8/2013   Addepalli et al.
2014/0136952 A1    5/2014   Zhu et al.
(Continued)

FOREIGN PATENT DOCUMENTS

| WO | 201700640 A1 | 1/2017 |
| WO | 2017106619 A1 | 6/2017 |
| WO | 2017173587 A1 | 10/2017 |

OTHER PUBLICATIONS

Kientopf Kai et al., "Service management platform to support service migrations for IoT smart city applications," 2017 IEEE 28th Annual International Symposium on Personal, Indoor, and Mobile Radio Communications (PIMRC), IEEE, Oct. 8, 2017, 5 pages.
(Continued)

*Primary Examiner* — Angela Nguyen
(74) *Attorney, Agent, or Firm* — Patterson + Sheridan, LLP

(57) ABSTRACT

Techniques are disclosed for maintaining reachability of an application moving between a central cloud network and a fog network using duplicate endpoint identifiers. Network characteristics of a cloud environment are monitored. The cloud environment includes a central cloud network and a fog network. A server in the central cloud network hosts an application that serves a client device. The application is assigned an endpoint identifier that is mapped to a locator identifier associated with the central cloud network. It is determined that a condition for moving the application to the fog network is satisfied based on the monitored network characteristics. An instance of the application is installed on a server in the fog network. The endpoint identifier is assigned to the application instance and mapped to a locator identifier associated with the fog network.

20 Claims, 8 Drawing Sheets

(51) Int. Cl.
H04L 12/26 (2006.01)
H04L 29/06 (2006.01)
(52) U.S. Cl.
CPC ............ *H04L 67/10* (2013.01); *H04L 67/101* (2013.01); *H04L 67/1008* (2013.01); *H04L 67/12* (2013.01); *H04L 67/148* (2013.01); *H04L 67/18* (2013.01); *H04L 67/2842* (2013.01); *H04L 67/34* (2013.01); *H04L 67/42* (2013.01); *H04L 61/6068* (2013.01); *H04L 61/6077* (2013.01)

(56) References Cited

U.S. PATENT DOCUMENTS

| | | | |
|---|---|---|---|
| 2015/0245160 A1* | 8/2015 | Agrawal | H04M 15/8044 455/406 |
| 2016/0065531 A1 | 3/2016 | Xiaopu et al. | |
| 2017/0264358 A1* | 9/2017 | Yamazaki | H04B 7/15507 |
| 2017/0366472 A1 | 12/2017 | Byers et al. | |
| 2018/0332483 A1* | 11/2018 | Yoon | H04W 24/04 |
| 2019/0037474 A1* | 1/2019 | Xu | H04L 41/0823 |
| 2019/0081890 A1* | 3/2019 | Ravindran | H04L 45/3065 |

OTHER PUBLICATIONS

International Search Report and Written Opinion of the International Searching Authority for Application No. PCT/US2019/012947, dated Apr. 30, 2019.

* cited by examiner

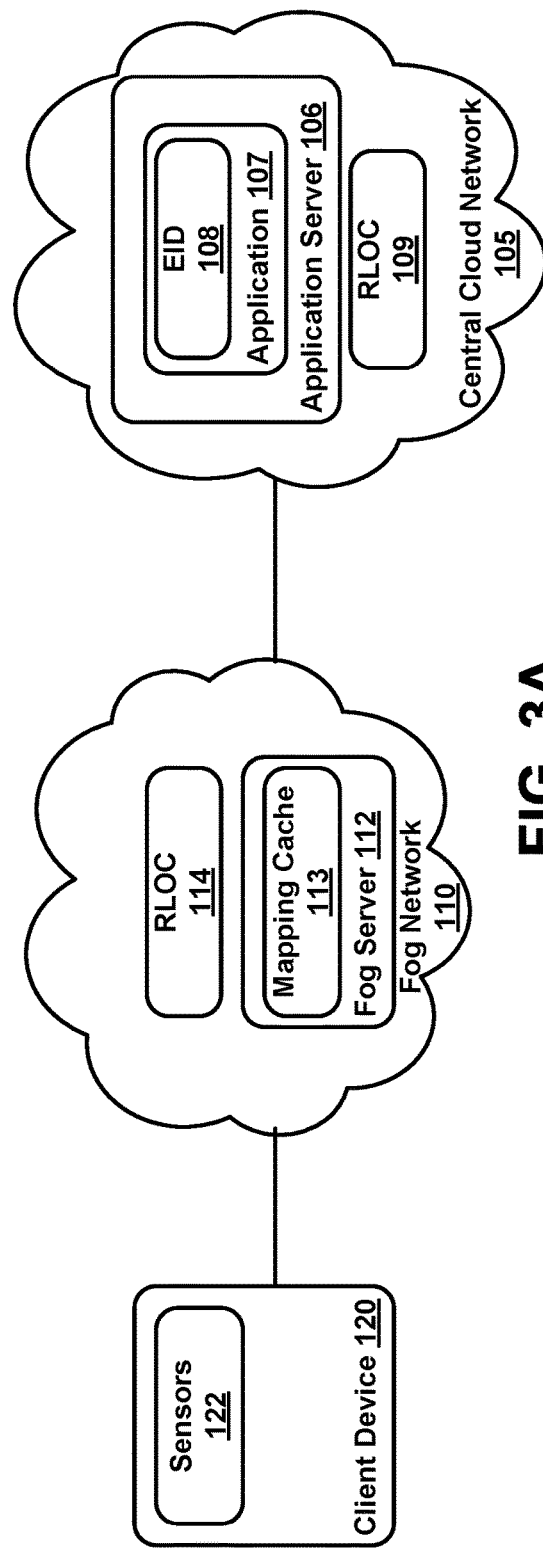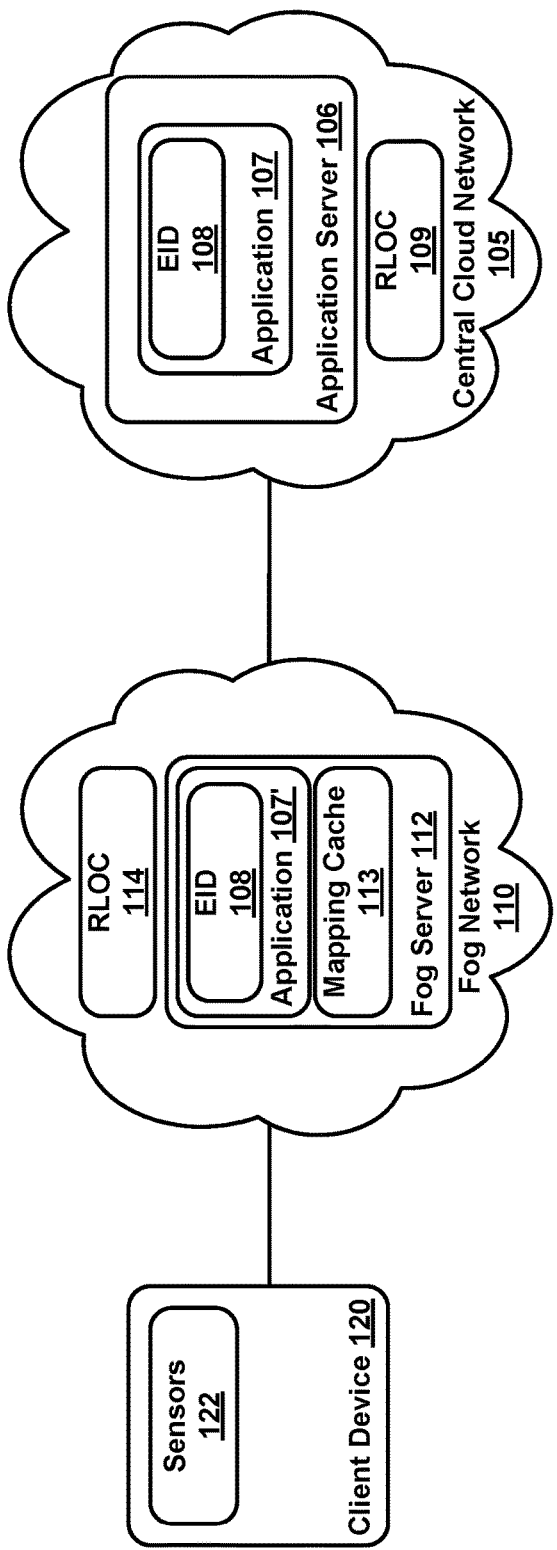
FIG. 3A
FIG. 3B

| EID | RLOC |
|---|---|
| 172.0.0.1 | 10.0.0.1 |
| ... | ... |
| ... | ... |
| ... | ... |
| ... | ... |

| EID | RLOC |
|---|---|
| 172.0.0.1 | 13.0.0.2 |
| ... | ... |
| ... | ... |
| ... | ... |
| ... | ... |

MAINTAINING REACHABILITY OF APPS MOVING BETWEEN FOG AND CLOUD USING DUPLICATE ENDPOINT IDENTIFIERS

TECHNICAL FIELD

Embodiments presented in this disclosure generally relate to network computing, and more specifically, to techniques for maintaining reachability of an application that is provisioned on cloud and fog networks.

BACKGROUND

Fog computing (also known as edge computing) is a decentralized architecture that provides storage, compute, and networking services via edge devices geographically proximate to an end-user. Bringing these services closer to the edge of a cloud network improves latency between the service and a client using the service. Thus, clients that typically require the results of compute service in real-time can benefit from fog computing. Examples of such clients include Internet-of-Things (IoT) devices that include sensors that are constantly obtaining data and need to make relatively quick decisions based on the data. Rather than send the data to a host on a cloud network, where the underlying processing can possibly take place in geographically distant regions, the client can instead send the data to a device residing in a fog network that is located closer to where the client is physically situated. Advantageously, fog computing complements cloud computing in such cases.

An issue that arises in leveraging fog computing in combination with cloud computing is efficiently determining when an application services should be accessed via a fog network rather than a cloud network, and vice versa. That is, at times, it is practical to keep compute services running in the cloud rather than in the fog, e.g., if the compute services are not often accessed by a client. Conversely, in other cases it is practical to perform carry out compute services in the fog, e.g., in times where traffic is increased. Further, in addition to determining where the services should be carried out, routing traffic from the client to the appropriate destination in a practical also becomes an issue.

BRIEF DESCRIPTION OF THE DRAWINGS

So that the manner in which the above-recited features of the present disclosure can be understood in detail, a more particular description of the disclosure may be had by reference to embodiments, some of which are illustrated in the appended drawings. Note, however, that the appended drawings illustrate only typical embodiments of this disclosure and are therefore not limiting of its scope, for the disclosure may describe other equally effective embodiments.

FIGS. 3A and 3B illustrate an example of creating a routable instance of an application hosted on a cloud server for a fog server in the computing environment, according to one embodiment.

FIGS. 4A and 4B illustrate an example mapping table as an instance of an application hosted on a cloud server is created on a fog server in the computing environment, according to one embodiment.

To facilitate understanding, identical reference numerals have been used, where possible, to designate identical elements that are common to the figures. It is contemplated that elements disclosed in one embodiment may be beneficially applied to other embodiments without specific recitation.

DESCRIPTION OF EXAMPLE EMBODIMENTS

Overview

Figure 1:
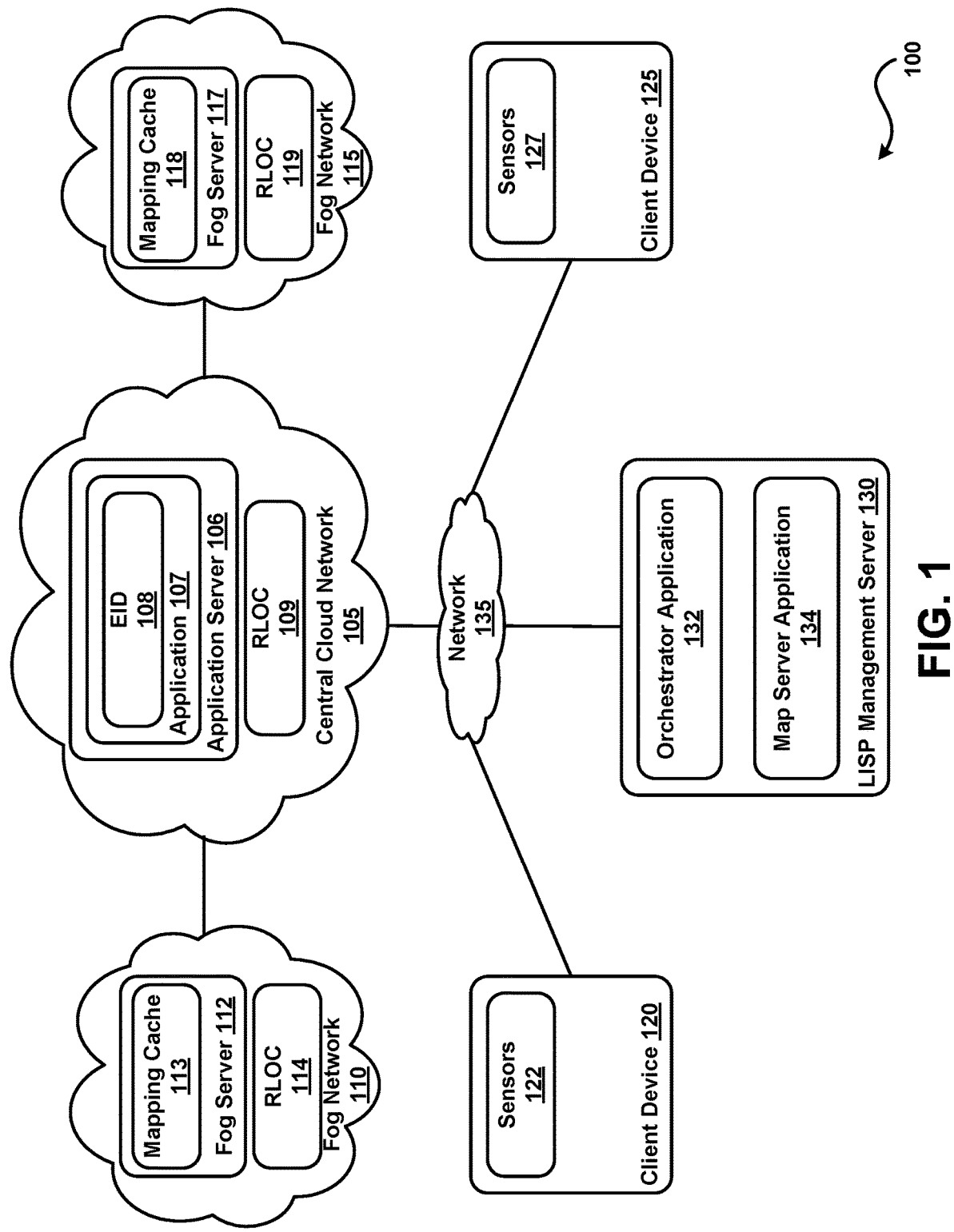
FIG. 1 illustrates an example computing environment, according to one embodiment.

Embodiments presented in this disclosure provide a method, computer-readable storage medium and system for maintaining reachability of an application moving between a central cloud network and a fog network using duplicate endpoint identifiers. The method, computer-readable storage medium and system include monitoring network characteristics of a cloud environment. The cloud environment includes a central cloud network and a first fog network. A server in the central cloud network hosts an application that serves at least a first client device. Moreover, the application is assigned an endpoint identifier that is mapped to a locator identifier associated with the central cloud network. The method, computer-readable storage medium and system also include determining, based on the monitored network characteristics, that a condition for moving the application to first fog network is satisfied. Additionally, the method, computer-readable storage medium and system include causing an instance of the application to be execute on a server in the first fog network. The method, computer-readable storage medium and system also include assigning the endpoint identifier to the instance of the application. Further, the method, computer-readable storage medium and system include mapping the endpoint identifier to a locator identifier associated with the first fog network.

Example Embodiments

Fog computing can effectively complement cloud computing in cases where client devices, such as Internet-of-Things devices, need data to be processed within a relatively short turnaround time. For example, a hospital that is equipped with sensor devices to control building floor temperature may obtain temperature data of a building floor and send the data to a remote server in the cloud for processing (e.g., to determine whether to increase, decrease, or maintain temperature). In some cases, rather than send the data to a compute service in the cloud server, where the underlying physical hardware can be located in a distant geographical region, it may be more practical to send the data to a device in a more geographically proximate fog network for carrying out the compute service. Such a scenario can be more efficient in cases where the client device is sending a relatively high amount of network traffic. In other cases, where the network traffic is not as high, doing so can be less efficient.

One approach to addressing this problem involves hosting the underlying application services on both the cloud and the fog networks. However, a concern arising from this approach is routing traffic to the appropriate location. Particularly, when a client addresses a packet to the application, the packet will include a destination address targeted to the IP address associated with the application. Therefore, the destination IP address would need to correspond to either the application hosted on the cloud or on the fog. Dynamically addressing the application to either the cloud or the fog based on network demand may be difficult or impractical.

Embodiments presented herein disclose techniques for maintaining reachability of an application that can move between a cloud network and a fog network. In particular, embodiments provide an approach for maintaining reachability under a network architecture that allows an IP address to be uniquely assigned to an application, such as the LISP (Locator/Identifier Separator Protocol) architecture.

Generally, the LISP architecture decouples identity and location characteristics that are traditionally inherent in an IP address. In particular, a LISP-supported network architecture uses two namespaces. One namespace includes endpoint identifiers (EIDs), such as an IP address, uniquely assigned to endpoint devices for identifying network sessions used between the devices. The other namespace includes routing locations (RLOCs) assigned to network devices for routing traffic through the network. The two namespace scheme allows an endpoint device to retain the same IP address even if moved to another geographical location in the network. A mapping server provides a table used to identify a RLOC presently associated with an EID. Routing devices that receive incoming packets may query the mapping server using an EID to identify the corresponding RLOC to which to route the packet.

In one embodiment, the central cloud network and associated fog networks are configured within a LISP routing and addressing architecture. Consequently, servers and applications executing in the architecture are each assigned a unique EID. Further, the servers and applications may also be assigned an RLOC determined based on their location. Further still, a management server may configure LISP-specific settings for the cloud and fog networks. For example, the management server may provide a map server application that maintains and modifies mappings between an EID and an RLOC. As another example, the management server may provide an orchestrator application that monitors network characteristics (e.g., network traffic) and performs various actions based on the monitored characteristics.

Under this approach, the orchestrator application monitors network traffic received at network endpoints. For example, the orchestrator application monitors packets sent by a client device that are addressed to an application hosted on the cloud network. Further, the orchestrator application monitors resource usage by the endpoints in the network. By default, the fog servers may route the packets towards the appropriate destination in the cloud network. In one embodiment, the orchestrator application may determine that a given network condition is satisfied, such as network traffic originating from the client devices to the application IP address exceeding a specified threshold of network traffic, or a measure of packet latency exceeding another specified threshold level of packet latency. The orchestrator application may also determine that the fog server has sufficient resources for handling compute services of the application.

For example, the application on the cloud may send compute statistics to the orchestrator, which in turn determines an amount of compute resources necessary to handle compute requests. In such a case, the orchestrator application may trigger an instance of the application to be installed on the fog server. The mapping server then assigns the application instance with the EID (i.e., the IP address) of the underlying application on the cloud. Further, the mapping server also associates the RLOC of the fog server with the EID and triggers the fog server to empty its cache of mapping entries.

As a result, when the client sends a subsequent packet addressed to the application, the fog server receives the packet and consults its cache of mapping entries to identify where to route the packet. Because the cache is clear of mapping entries, the fog server queries the mapping server for the RLOC associated with the EID specified in the packet. The mapping server, in response, returns the RLOC associated with the fog server, indicating to the fog server that the application is stored locally. In response, the application receives the packet at the fog server and processes the packet.

Advantageously, embodiments provide an approach for dynamically moving an application between cloud and fog networks of a network architecture such that the application retains its IP address regardless of where the application is currently located within the network architecture. For instance, techniques allow compute services to be performed for a client in either the fog or the cloud based on network demand. Because the LISP architecture decouples the IP address from a physical location, the application is able to move across different locations in the network as needed, without any change in the IP address used to identify the application. As a result, the client devices that request the application services, such as compute services, can remain agnostic regardless of whether the application resides in the cloud or in the fog. That is, the client device can send a packet to the application using the associated EID and the packet will be routed to either the fog or the cloud, based on the present mappings between the EID and an RLOC. Therefore, these application services can be processed more efficiently based on demand or lack thereof.

Note, the following references LISP as a network architecture that allows an application to retain a unique network address regardless of where in the architecture the application is currently executing. However, one of skill in the art will recognize that embodiments presented herein may be adapted to other network architectures where network components such as applications that can be associated with a unique network address that is not coupled to a location. For example, Virtual Extensible LAN (VXLAN) technology encapsulates, in a VXLAN header, a MAC address associated with a destination application to serve as an identifier.

FIG. 1 illustrates an example computing environment 100, according to one embodiment. As shown, the computing environment 100 includes a central cloud network 105, a fog network 110, a fog network 115, a client device 120, a client device 125, and a Locator/Identifier Separation Protocol (LISP) management server 130. The central cloud network 105, LISP management server 130, client device 120, and client device 125 are interconnected via a network 135 (e.g., the Internet).

In one embodiment, the central cloud network 105, fog network 110, and fog network 115 may be part of the same cloud provider network infrastructure, where the fog network 110 and fog network 115 represent networked devices and services situated towards logical edges of the infrastructure. In one embodiment, the central cloud network 105, fog network 110, fog network 115, and the LISP management server represent components of a LISP network architecture. Illustratively, the central cloud network 105 includes an application server 106. The application server 106 may be a virtual machine instance executing on the cloud central cloud network 105. The application server 106 hosts an application 107. In this example, the application 107 many provide services to the client devices 120 and 125.

For instance, the client devices 120 and 125 may correspond to Internet-of-Things (IoT) devices, where the client device 120 includes sensors 122 and the client device 125 includes sensors 127. The sensors 122 and 127 may obtain data to be processed by the application 107. For example, in this case, assume that the client devices 120 and 125 each correspond to a smart thermostat that regulates temperature in a respective commercial building. The sensors 122 any obtain temperature readings in periodic intervals, package the temperature reading data, and send the temperature reading data to the application 107. The application 107 provides compute services to process the temperature data. Once the compute services are executed, the application 107 may return a result to the client device 120, where the result may be some trigger to perform an action, such as increase or decrease the temperature.

The application 107 may perform compute services on behalf of the client devices 120 and 125 and return results to the devices. Generally, a client device, such as client device 120 sends a packet including the data to compute services provided by the application 107, where the packet header specifies a destination address corresponding to the IP address of the application 107. The packet may be routed via intermediary networking devices before reaching the application 107. For instance, a packet may be received at one of the fogs 110 or 115, depending on the routing schemes configured within the central cloud network 105. As an example, a fog that is more geographically proximate to the client device may receive the packet at a networking device located in the fog.

Illustratively, the fogs 110 and 115 each provide fog servers 112 and 117. The fog servers 112 and 117 may be virtual machine instances executing in network devices in the network, such as routers and switches. As routers and switches typically provide limited compute services, the fog servers 112 and 117 can be suited to performing compute tasks that require relatively low processing power. Further, the fog servers 112 and 117 may include networking logic for receiving packets sent from the client device 120 (or client device 125) and routing the packets to the application 107. In this example, assume that the client device 120 is located in a region that is geographically proximate to the fog network 110, and that the client device 125 is located in a region that is proximate to fog network 115.

As stated, the central cloud network 105, fogs 110 and 115, and LISP management server 130 represent a LISP network infrastructure. Such an infrastructure provides a framework for decoupling identifier and locator aspects of an IP address. In particular, the framework provides a namespace used to identify a given endpoint, an endpoint identifier (EID), and another namespace used to identify a network routing location, a routing locator (RLOC). At any rate, regardless of where in the network infrastructure an endpoint may be located, it will retain the same unique EID that can be addressed using an RLOC. For example, the application 107 may be associated with an EID 108. The EID 108 generally corresponds to an IP address associated with the application 107. However, one of skill in the art may recognize that other identifiers many used to uniquely identify the application. Further, the central cloud network 105 provides an RLOC 109. The RLOC 109 is an address that indicates a location with which the EID 108 is currently associated. For example, the RLOC 109 may be mapped with the EID 108 of application 107. Further, each of the fogs 110 and 115 provide an RLOC 114 and 119, respectively. Each of the RLOCs 114 and 119 indicate the location of the respective fog network.

The map server application 134 maintains EID-to-RLOC mappings in a mapping database. Generally, the map server application 134 may process requests for determining a particular RLOC currently associated with an EID. In addition, the map server application 132 may modify the EID-to-RLOC mappings in the event that a device or application associated with an EID moves to another location in the network. In such a case, the map server application 132 associates the EID with an RLOC of the other location in the network. Further, each of the fog servers 112 and 117 includes a mapping cache 113 and 114, respectively. The mapping caches 113 and 114 provide cached EID-to-RLOC mappings obtained in routing packets to the appropriate destination within the network infrastructure.

In one embodiment, multiple endpoints in the network may share the same EID. Doing so allows multiple instances of a given application to be distributed at different points of the network and retain the same IP address regardless of the where the instance of the application is located. More specifically, this provides the application with mobility across the network. For example, although FIG. 1 depicts the application 107 running on an application server 106 in the central cloud network 105, an instance of the application can be created on the fog network 110, such as on the fog server 112. In such a case, the instance of the application can be assigned an EID identical to the application 107. However, the RLOC assigned to the EID would differ, i.e., the EID would be associated with the RLOC registered to the fog network 110.

Further, the LISP management server 130 provides an orchestrator application 132 that manages endpoints in the network infrastructure. For instance, the orchestrator application 132 monitors network traffic between devices within the cloud network. In addition, the orchestrator application 132 monitors traffic between client devices and the network infrastructure. For example, the orchestrator application 132 may monitor the rate of traffic flowing from a given client device to a fog server. Further still, the orchestrator application 132 monitors resources of the endpoints, such as compute resources in a given networking device. The orchestrator application 132 may evaluate the monitored traffic to determine whether conditions specified in a network configuration are satisfied. For example, the orchestrator application 132 may determine that the rate of traffic exceeds a given threshold. If such conditions are satisfied, the orchestrator may trigger certain actions to be performed. Note, although FIG. 1 depicts the orchestrator application 132 and map server application 134 as residing on a single server, other embodiments may provide the orchestrator application 132 and map server application 134 as residing on separate servers.

Figure 2:
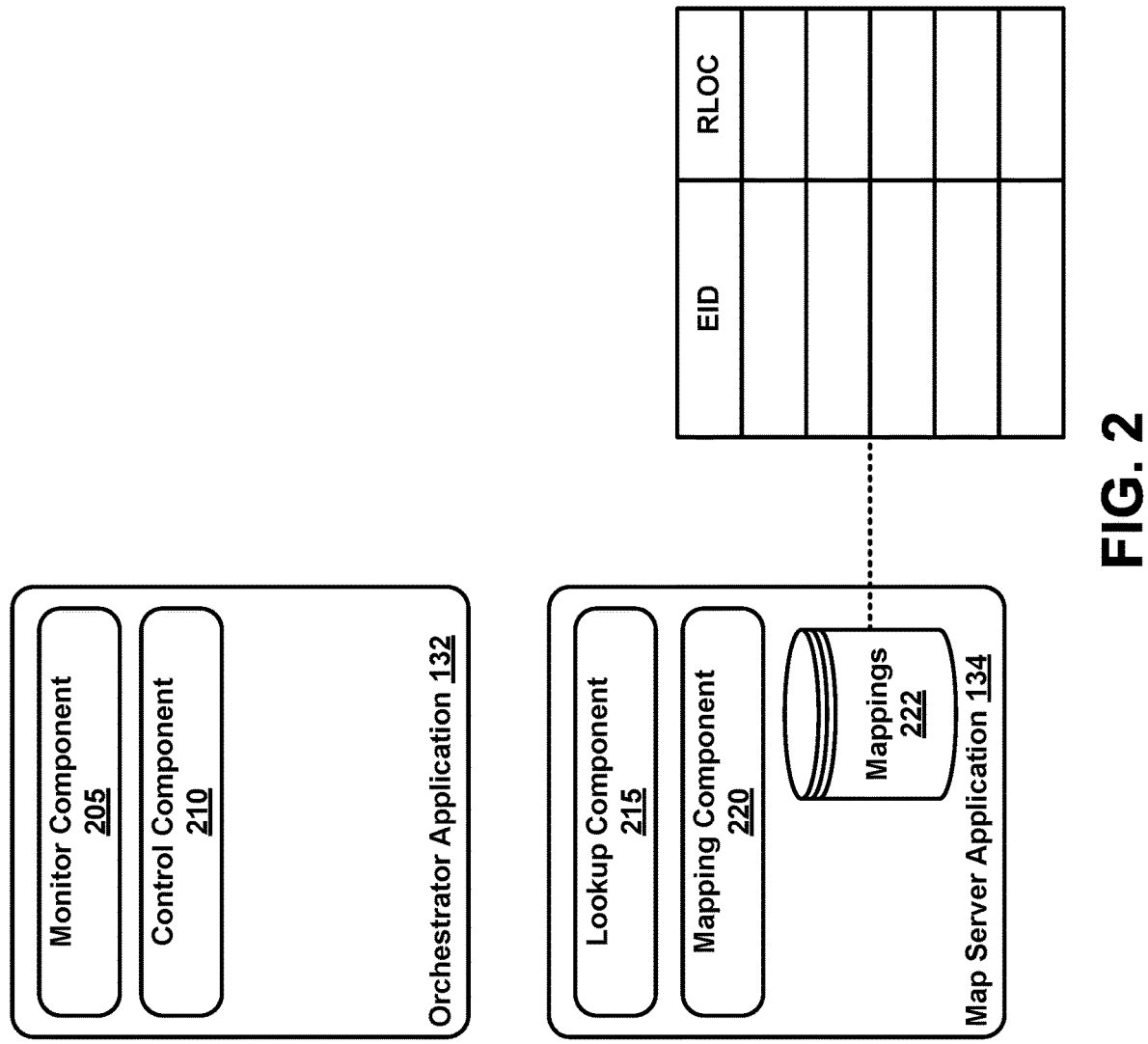
FIG. 2 further illustrates the orchestrator and mapping server applications described relative to FIG. 1, according to one embodiment.

FIG. 2 further illustrates the orchestrator application 132 and map server application 134, according to one embodiment. As shown, the orchestrator application 132 includes a monitor component 205 and a control component 210. The monitor component 205 observes network traffic flowing between endpoints in the network infrastructure as well as incoming traffic from remote client devices. To do so, the monitor component 205 may, for example, send end-to-end probes to endpoint devices in the network infrastructure. The monitor component 205 may also calculate and store network statistics and send the same to the control component 210. In addition, the monitor component 205 may track resource usage of the endpoints, such as processing, bandwidth, and storage in a given endpoint.

The control component 210 evaluates the network traffic and resource usage observed by the monitor component 205 against specified conditions. Example conditions include whether a rate of traffic occurring between remote client devices to fog servers residing at the edge of the network infrastructure exceeds (or falls below) a specified threshold, whether latency between two endpoints exceeds a particular threshold, etc. Further, these conditions, if satisfied, can trigger the control component 210 to perform certain actions. For example, the control component 210 may cause an instance of an application to be installed on a fog server, so that the fog server may process compute tasks via the locally installed application (provided that the fog server is observed to have sufficient compute resources to do so). The control component 210 may be configured with application programming interfaces (APIs) and access permissions that allow the control component 210 to execute commands within a given networked device or networking application.

Illustratively, the map server application 134 includes a lookup component 215, mapping component 220, and mappings 222. The lookup component 215 receives queries from devices in the network infrastructure requesting a mapping for a RLOC currently assigned to a given EID. The lookup component 215 processes the query and obtains the requested mapping from the mappings 222. Generally, the mappings 222 is a database that is indexed by EID and provides EID-to-RLOC mappings that are currently assigned in the network infrastructure. Other implementations of the mappings 222 can provide the mappings as key-value pairs, using the EIDs as keys and RLOC as values returned by a lookup of the EID.

The mapping component 220 registers EID-to-RLOC mappings to the mappings 222. For example, the mapping component 220 may do so in response to instructions from the control component 210 to update mappings in cases where an instance of an application originally hosted on the cloud is installed on a fog server. The mapping component 220 may also instruct a fog server to clear a local mapping cache after modifying a mapping. As a result, a fog server that ordinarily has a mapping stored in the cache would subsequently request the updated mapping from the map server application 134.

FIGS. 3A and 3B illustrate an example of creating a routable instance of an application hosted on a cloud server for a fog server in the computing environment, according to one embodiment. In particular, FIG. 3A depicts a scenario where data from sensors 122 of a client device 120 is routed to the application 107, as hosted in the central cloud network 105. FIG. 3B depicts a scenario where an instance of the application 107 (application 107') is installed on the fog server 112 and processes requests for compute services by the client device 120.

In FIG. 3A, the client device 120 may send a packet to the application 107, which is hosted on the application server 106 on the central cloud network 105. The packet header includes the EID 108 associated with the application 107, i.e., the IP address associated with the application 107. The packet may be received at the fog server 112 in the fog network 110. The fog server 112 identifies an EID-to-RLOC mapping for directing a given packet in the network infrastructure. In this case, the fog server 112 identifies that the packet is addressed to the application 107 at the application server 106, based on the mapping of EID 108 to RLOC 109. The fog server 112 directs the packet to be received and processed by the application 107.

In one embodiment, the orchestrator application 132 may detect that a rate of network traffic between the client device 120 and the fog network 110 exceeds a specified threshold. The orchestrator application 132 may also determine, based on observed usage, that the fog server 112 has compute resources available to run the application 107. The orchestrator application 132 may direct the fog server 112 to download the application 107' instance from the application server 106. Illustratively, in FIG. 3B, the application 107' includes the EID 108, which is shared by the application 107. However, the application 107' is associated with a different RLOC (i.e., RLOC 114), which corresponds to its location in the fog server 112. In addition, the orchestrator application 132 directs the map server application 134 to update mappings 222 such that the EID 108 is mapped to the RLOC 114. The map server application 134 may also direct the fog server 112 clear its mapping cache such that when the fog server 112 subsequently receives a request directed to the EID 108, the fog server 112 queries the map server application 134 for the appropriate mapping.

In FIG. 3B, the client device 120 may send a packet addressed to the application 107, i.e., the packet header includes the EID 108. The fog server 112 receives the packet and determines that the appropriate mapping for EID 108 is RLOC 114. As a result, the fog server 112 processes the packet via the application 107' locally, rather than forwarding the packet to the application server 106.

Packet traffic for the application 107 that routes through a fog network other than fog network 110 may still be processed at the central cloud network 105. For example, assume that the client device 125 sends a packet to the application 107 that includes data for compute services. The packet is received at the fog network 115, and the fog server 117 may determine that the EID-to-RLOC mapping is at RLOC 109, e.g., based on the mapping cache 118 keeping the original mapping.

FIGS. 4A and 4B illustrate an example mapping table as an instance of an application hosted on a cloud server is created on a fog server in the computing environment, according to one embodiment. FIGS. 4A and 4B further describe the example presented in FIGS. 3A and 3B. In particular, FIG. 4A depicts the mappings 222 relative to FIG. 3A, and FIG. 4B depicts the mappings 212 relative to FIG. 4B.

The mappings 222 of FIG. 4A provide a mapping of the EID 108 (i.e., associated with the application 107) to the RLOC 109. The EID 108 corresponds to 172.0.0.1, which, for this example, is the underlying IP address of the application 107. The EID 108 is mapped to an RLOC 109 at address 13.0.0.2. The 13.0.0.2 address corresponds to a location in the central cloud network 105.

The mappings 222 of FIG. 4B provide a mapping of the EID 108 to the RLOC 114. The EID 108 is identical to the EID of application 107 executing on the application server 106. EID 108 will have the same underlying IP address 172.0.0.1.However, the duplicated EID will make sure that the clients accessing this application 107 will not have to change their IP address. For reachability, however, in this example, the EID 108 is mapped to the RLOC 114 at address 10.0.0.1. The 10.0.0.1 address corresponds to a location in the fog network 110. The fog server 112 at fog network 110 may query the map server application 132 and receive the mapping of EID 108 to RLOC 114. Because the RLOC 114 corresponds to the application 107' at the fog server 112, the fog server 112 may process packets addressed to EID 108 locally.

Figure 5:
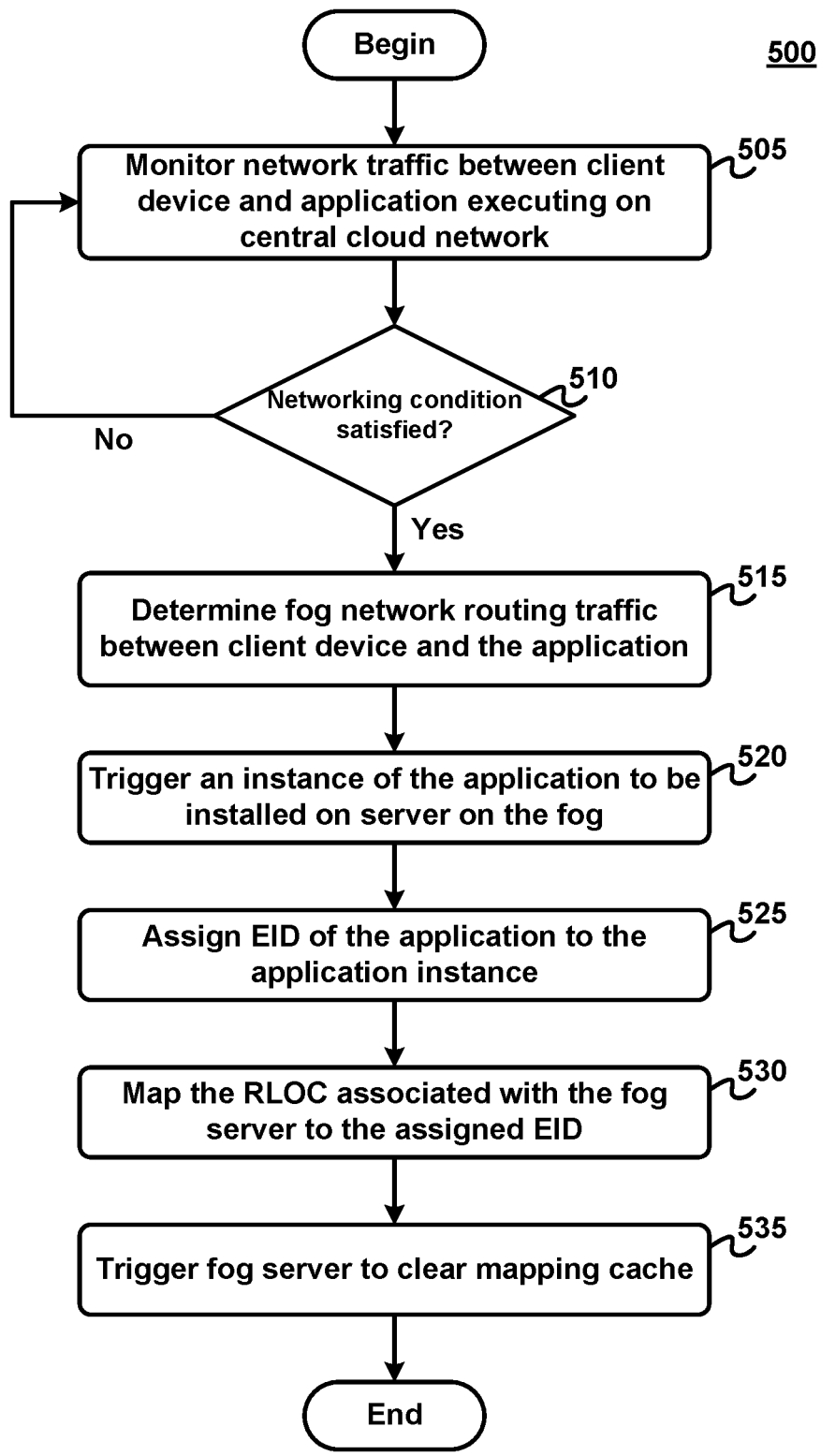
FIG. 5 illustrates an example method for creating an instance of an application hosted on a cloud server on a fog server, according to one embodiment.

FIG. 5 illustrates an example method 500 for creating an instance of an application hosted on a cloud server on a fog server, according to one embodiment. As shown, method 500 begins at step 505, where the orchestrator application 132 monitors network traffic (e.g., via the monitor component 205) between a client device and an application (e.g., application 107) executing on the central cloud network 105. The orchestrator application 132 may also monitor resource usage of the endpoints in the network infrastructure. At step 510, the orchestrator application 132 determines whether a networking condition is satisfied. For example, conditions can include whether the network traffic rate exceeds a specified threshold or whether the traffic latency exceeds another specified threshold. Other conditions may also include whether a fog server receiving traffic from the client device has a specified amount of compute resources. If a networking condition is not satisfied, the method 500 returns to step 505.

Otherwise, at step 515, the orchestrator application 132 determines, based on the observed network data, the fog network that routes traffic between the client device and the application. To do so, the orchestrator application 132 may evaluate the routing path taken by a given packet in the network traffic from the client device to the application 107. For the purpose of this example, assume that the packets originate from client device 120 and flow through the fog network 110 before reaching the destination at the central cloud network 105. The orchestrator application 132 may identify the fog server 112 (or the underlying network device executing the fog server 112 atop a hypervisor) as routing the traffic between the client device and the application.

At step 520, the orchestrator application 132 triggers an instance of the application to be downloaded and installed on the fog server. Continuing the previous example, the orchestrator application 132 may send a command to the fog server 112 (e.g., using an API associated with the fog server 112) to download the application 107. The command may include a locator address within the network that provides access to the application 107. Further, the orchestrator application 132 may execute a command or series of commands for causing the fog server 112 to install and execute the application instance (e.g., application 107').

At step 525, the map server application 134 assigns the EID associated with the application (as hosted on the cloud) to the application instance. The EID may be identified via a configuration for the network infrastructure. At step 530, the map server application 134 maps the RLOC associated with the fog server to the assigned EID. Here, the map server application 134 assigns the EID of the application 107' to EID 108. Further, the map server application 134 maps RLOC 114 to the EID 108.

At step 535, the map server application 134 triggers the fog server to clear the mapping cache stored locally with the fog server. For example, the map server application 134 may send a command to the fog server directed to clearing the cache. Doing so results in the fog server subsequently requesting the EID-to-RLOC mapping for the EID 108 from the map server application 134, rather than using the local mapping cache to determine the mapping. Consequently, a lookup of the EID 108 to the map server application 134 will result in the map server application 134 returning the RLOC 114.

Figure 6:
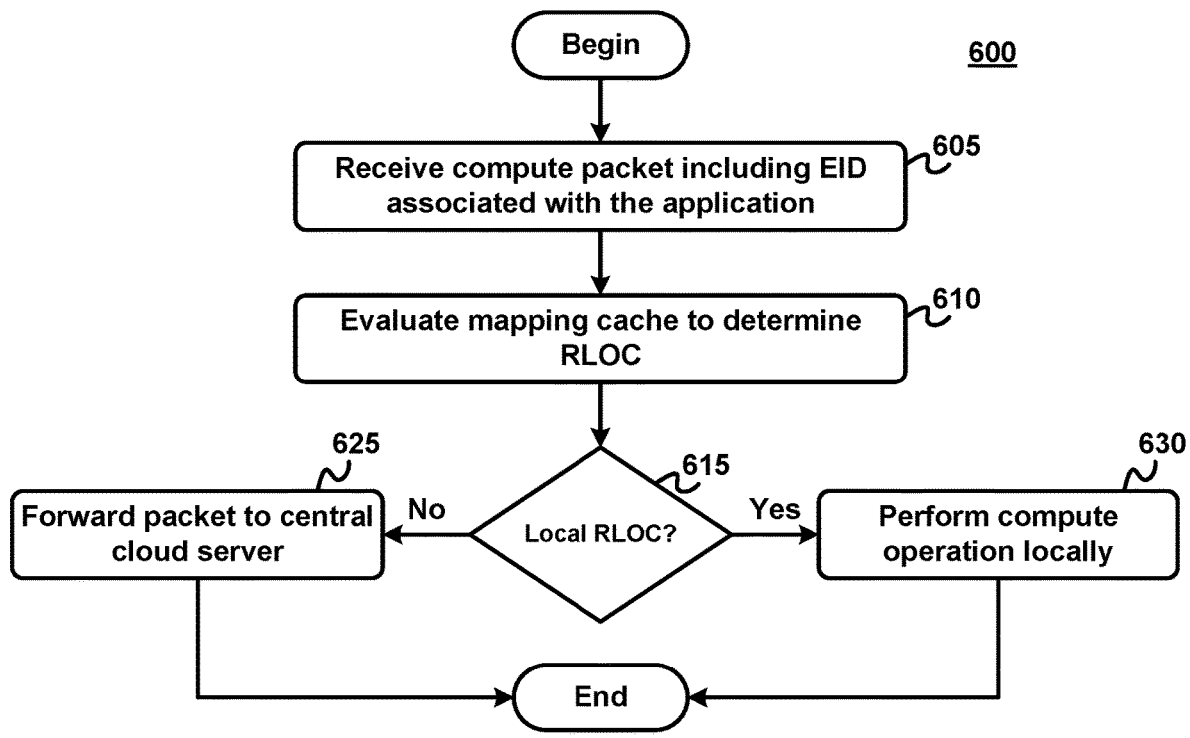
FIG. 6 illustrates an example method for processing, by a fog server, a packet addressed to an application, according to one embodiment.

FIG. 6 illustrates an example method for processing, by a fog server, a packet addressed to an application, according to one embodiment. In this example, assume that the fog server 112 performs the method 600. As shown, the method 600 begins at step 605, where the fog server 112 receives a packet from the client device 120. For example, the client device 120 may send a packet towards the fog server 112 requesting compute services from the application 107. The packet header may include the EID 108 addressing the application 107.

At step 610, the fog server 112 evaluates its local mapping cache (mapping cache 113) to determine the RLOC assigned to the EID 108. For example, the fog server 112 may formulate a database query using the EID 108 to retrieve the corresponding RLOC address. At step 615, the fog server 112 determines whether the RLOC retrieved from the mapping cache 113 is local to the fog network 110 (i.e., the RLOC is RLOC 114). If not, then the fog server 112 routes the packet to the destination RLOC. Otherwise, if the RLOC is local to the fog network 110, then at step 630, the fog server 112 processes the packet locally and performs the compute services via the application instance installed on the fog server 112.

Figure 7:
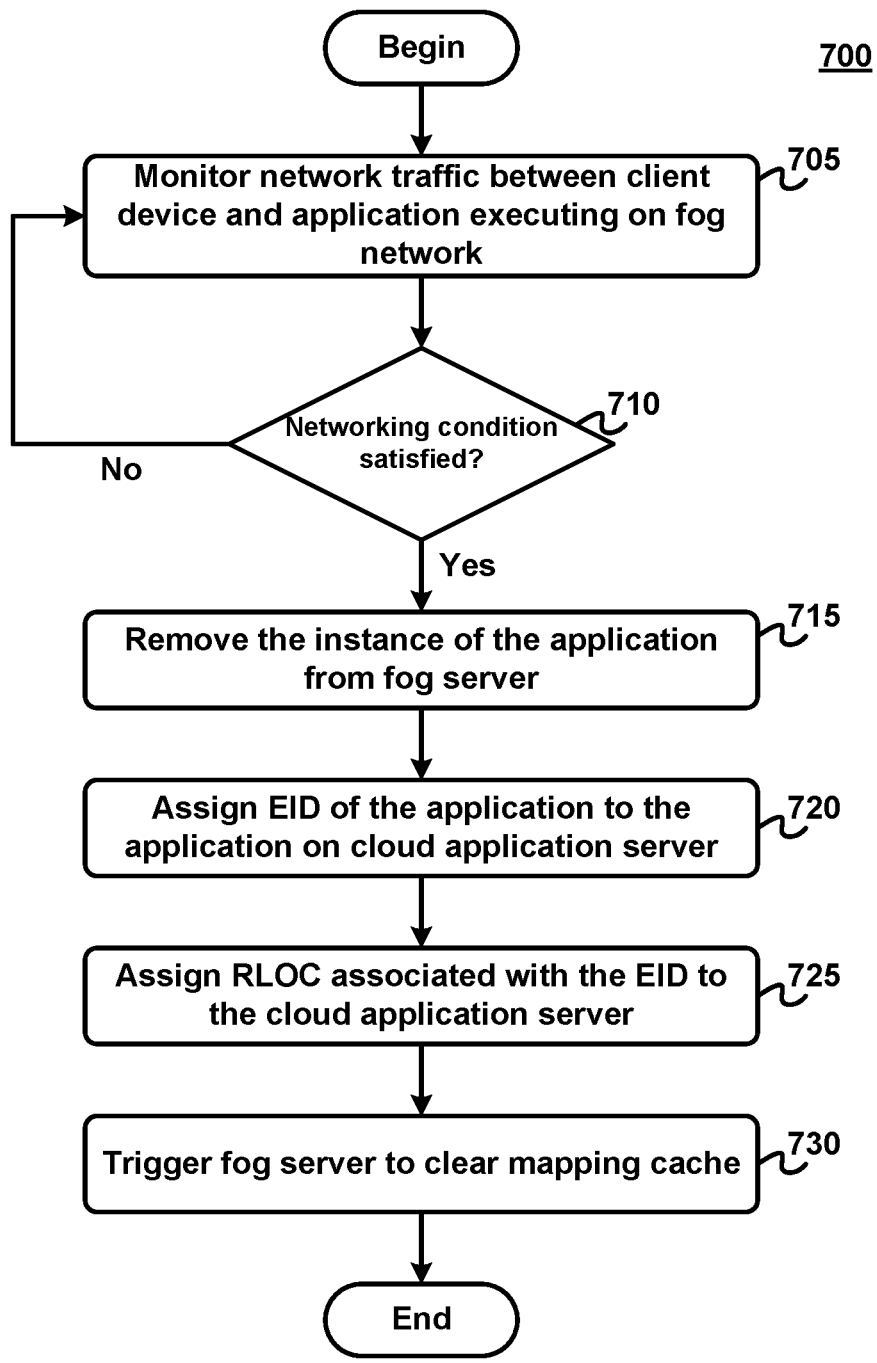
FIG. 7 illustrates an example method for removing an instance of an application hosted on a fog server, according to one embodiment.

FIG. 7 illustrates an example method 700 for removing an instance of an application hosted on a fog server, according to one embodiment. As shown, method 700 begins at step 705, where the orchestrator application 132 monitors network traffic (e.g., via the monitor component 205) between a client device and an application (e.g., application 107') executing on the fog network (e.g., fog network 110). Further, the orchestrator application 132 may also monitor resource usage of the endpoints in the network infrastructure. At step 710, the orchestrator application 132 determines whether a networking condition is satisfied. For example, conditions can include whether the network traffic rate falls below a specified threshold or whether the traffic latency falls below another specified threshold. Other conditions may also include whether a fog server receiving traffic from the client device no longer has a specified amount of compute resources. If a networking condition is not satisfied, the method 700 returns to step 705.

Otherwise, at step 715, the orchestrator application 132 directs the fog server executing the application instance locally to remove the instance. For example, the orchestrator application 132 may send a command to the fog server 112 (e.g., using an API associated with the fog server 112) to delete the application 107'. The command may include a locator address within the network that provides access to the application 107. Further, the orchestrator application 132 may execute a command or series of commands for causing the fog server 112 to install and execute the application instance (e.g., application 107').

At step 720, the map server application 134 assigns the EID associated with the application instance to the application executing on the central cloud network 105. At step 725, the map server application 134 maps the RLOC associated with the central cloud network 105 to the assigned EID. Here, the map server application 134 assigns maps RLOC 109 to the EID 108.

At step 730, the map server application 134 triggers the fog server to clear the mapping cache stored locally with the fog server. For example, the map server application 134 may send a command to the fog server directed to clearing the cache. Doing so results in the fog server subsequently requesting the EID-to-RLOC mapping for the EID 108 from the map server application 134, rather than using the local mapping cache to determine the mapping. Consequently, a lookup of the EID 108 to the map server application 134 will result in the map server application 134 returning the RLOC 109.

Figure 8:
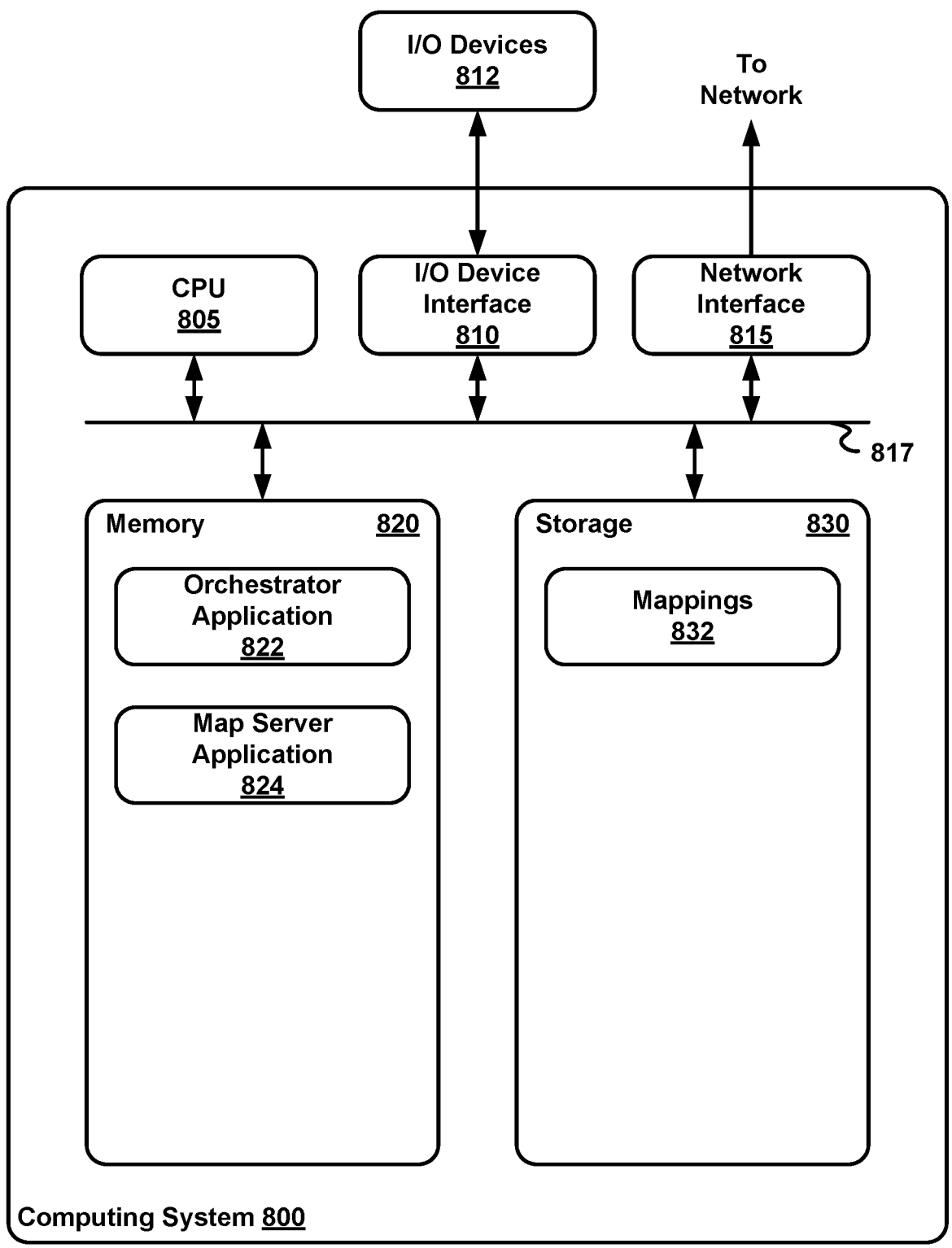
FIG. 8 illustrates an example computing system used to manage routing for services provided by an application, according to one embodiment.

FIG. 8 illustrates an example computing system 800 used to manage routing for services provided by an application, according to one embodiment. As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812 (e.g., keyboard, display, mouse devices, etc.) to the computing system 800. Further, in context of the present disclosure, the computing elements shown in the computing system 800 may correspond to a physical computing system (e.g., a system in an enterprise network) or a virtual computing instance.

CPU 805 retrieves and executes programming instructions stored in memory 820 as well as stores and retrieves application data residing in the storage 830. The bus 817 is used to transmit programming instructions and application data between CPU 805, I/O devices interface 810, storage 830, network interface 815, and memory 820. Note, CPU 805 is included to be representative of a single CPU, multiple CPUs, a single CPU having multiple processing cores, and the like. Memory 820 is generally included to be representative of a random access memory. Storage 830 may be a disk drive storage device. Although shown as a single unit, storage 830 may be a combination of fixed and/or removable storage devices, such as fixed disc drives, removable memory cards, or optical storage, network attached storage (NAS), or a storage area-network (SAN).

Illustratively, memory 820 includes an orchestrator application 822 and a map server application 824. And storage 830 includes mappings 832. The orchestrator application 822 monitors network characteristics, such as traffic statistics and resource usage of endpoints in an underlying LISP network infrastructure. Further, the orchestrator application 822 directs endpoints in the network infrastructure to perform certain actions based on the monitored network characteristics. For instance, the orchestrator application 822 may cause a server instance executing in a fog network situated in the edge of a cloud provider network to download and install an application instance on the fog server, so that the fog server can execute the application instance to serve application services (such as compute tasks) on behalf of requesting clients. In addition, the orchestrator application 822 may cause the server executing on the fog to remove an application instance, e.g., in cases where network traffic between the client devices and the application decreases below a threshold.

The map server application 824 maintains the mappings 832. The mappings 832 provide a database of EID-to-RLOC mappings for the LISP network infrastructure. In cases where the orchestrator application 822 causes the fog server to install (or remove) a local application instance, the map server application 824 may update the EID-to-RLOC mapping to reflect the change in which application instance serves the client devices. For example, after an application instance is installed on the fog server, the map server application 824 may assign an EID of the application hosted on the cloud to the installed application instance. The map server application 824 also maps the RLOC associated with the fog to EID. As another example, after an application instance is removed from the fog server, the map server application 824 may remap the EID to the RLOC associated with the central cloud.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the orchestrator application and the map server application) or related data available in the cloud. For example, the orchestrator application and the map server application could execute on a computing system in the cloud and direct an endpoint server in a fog network to install an application originally executing on a cloud host and update network EID-to-RLOC mappings such that the EID associated with the application is assigned to an RLOC associated with the fog network. The map server application could store the mapping tables at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

monitoring network characteristics of a cloud environment, wherein the cloud environment includes a central cloud network and a fog network, wherein the central cloud network hosts an application that serves at least a first client device, wherein the application is assigned an endpoint identifier, the endpoint identifier being mapped to a first locator identifier associated with the central cloud network, and wherein the fog network comprises a mapping cache, the mapping cache comprising a first entry mapping the endpoint identifier to the first locator identifier;

determining, based on the monitored network characteristics, that a condition for executing the application at the fog network is satisfied;

causing an instance of the application to be executed in the fog network;

assigning the endpoint identifier to the instance of the application;

mapping the endpoint identifier to a second locator identifier associated with the fog network;

clearing the first entry in the mapping cache; and receiving a request at the fog network from the first client device to access the application, and in response, based on the cleared first entry, determining from a mapping server that the endpoint identifier is mapped to the second locator identifier.

2. The method of claim 1, further comprising:
  determining, based on the monitored network characteristics, that a condition for moving the application to the central cloud network is satisfied;
  causing the instance of the application to be removed from the fog network; and
  mapping the endpoint identifier to the first locator identifier associated with the central cloud network.

3. The method of claim 1, wherein the condition for executing the application at the fog network comprises a rate of network traffic between the fog network and the first client device exceeding a specified threshold.

4. The method of claim 3, wherein the condition for executing the application at the fog network further comprises a determination that the fog network has sufficient resources to execute the application.

5. The method of claim 1, wherein a packet that is sent by a client device to the application is received by the fog network and processed by the instance of the application.

6. The method of claim 1, wherein the cloud environment is a Locator/Identifier Separation Protocol (LISP) network, wherein the mapping server is part of a LISP management server, wherein the endpoint identifier comprises an Internet Protocol (IP) address, and wherein the first locator identifier and the second locator identifier each comprise a routing locator (RLOC).

7. The method of claim 1, wherein determining from the mapping server that the endpoint identifier is mapped to the second locator identifier comprises:
  transmitting a query from the fog network to the mapping server for a locator identifier associated with the endpoint identifier;
  receiving, at the fog network, a response from the mapping server identifying the second locator identifier; and
  storing in the mapping cache at the fog network a second entry mapping the endpoint identifier to the second locator identifier.

8. A non-transitory computer-readable storage medium storing instructions, which, when executed on a processor, performs an operation, the operation comprising:
  monitoring network characteristics of a cloud environment, wherein the cloud environment includes a central cloud network and a fog network, wherein the central cloud network hosts an application that serves at least a first client device, wherein the application is assigned an endpoint identifier, the endpoint identifier being mapped to a first locator identifier associated with the central cloud network, and wherein the fog network comprises a mapping cache, the mapping cache comprising a first entry mapping the endpoint identifier to the first locator identifier;
  determining, based on the monitored network characteristics, that a condition for executing the application at the fog network is satisfied;
  causing an instance of the application to be executed in the fog network;
  assigning the endpoint identifier to the instance of the application;
  mapping the endpoint identifier to a second locator identifier associated with the fog network;
  clearing the first entry in the mapping cache; and
  receiving a request at the fog network from the first client device to access the application, and in response, based on the cleared first entry, determining from a mapping server that the endpoint identifier is mapped to the second locator identifier.

9. The non-transitory computer-readable storage medium of claim 8, wherein the operation further comprises:
  determining, based on the monitored network characteristics, that a condition for moving the application to the central cloud network is satisfied;
  causing the instance of the application to be removed from the fog network; and
  mapping the endpoint identifier to the first locator identifier associated with the central cloud network.

10. The non-transitory computer-readable storage medium of claim 8, wherein the condition for executing the application at the fog network comprises a rate of network traffic between the fog network and the first client device exceeding a specified threshold.

11. The non-transitory computer-readable storage medium of claim 10, wherein the condition for executing the application at the fog network further comprises a determination that the fog network has sufficient resources to execute the application.

12. The non-transitory computer-readable storage medium of claim 8, wherein a packet that is sent by a client device to the application is received by the fog network and processed by the instance of the application.

13. The non-transitory computer-readable storage medium of claim 8, wherein the cloud environment is a Locator/Identifier Separation Protocol (LISP) network, wherein the mapping server is part of a LISP management server, wherein the endpoint identifier comprises an Internet Protocol (IP) address, and wherein the first locator identifier and the second locator identifier each comprise a routing locator (RLOC).

14. The non-transitory computer-readable storage medium of claim 8, wherein determining from the mapping server that the endpoint identifier is mapped to the second locator identifier comprises:
  transmitting a query from the fog network to the mapping server for a locator identifier associated with the endpoint identifier;
  receiving, at the fog network, a response from the mapping server identifying the second locator identifier; and
  storing in the mapping cache at the fog network a second entry mapping the endpoint identifier to the second locator identifier.

15. A system, comprising:
  a processor; and
  a memory having program code, which, when executed on the processor, performs an operation, the operation comprising:
  monitoring network characteristics of a cloud environment, wherein the cloud environment includes a central cloud network and a fog network, wherein the central cloud network hosts an application that serves at least a first client device, wherein the application is assigned an endpoint identifier, the endpoint identifier being mapped to a first locator identifier associated with the central cloud network, and wherein the fog network comprises a mapping cache, the mapping cache comprising a first entry mapping the endpoint identifier to the first locator identifier;
  determining, based on the monitored network characteristics, that a condition for executing the application at the fog network is satisfied;
  causing an instance of the application to be executed in the fog network;
  assigning the endpoint identifier to the instance of the application;

mapping the endpoint identifier to a second locator identifier associated with the fog network;

clearing the first entry in the mapping cache; and receiving a request at the fog network from the first client device to access the application, and in response, based on the cleared first entry, determining from a mapping server that the endpoint identifier is mapped to the second locator identifier.

16. The system of claim 15, wherein the operation further comprises:

determining, based on the monitored network characteristics, that a condition for moving the application to the central cloud network is satisfied;

causing the instance of the application to be removed from the fog network; and mapping the endpoint identifier to the first locator identifier associated with the central cloud network.

17. The system of claim 15, wherein the condition for executing the application at the fog network comprises a rate of network traffic between the fog network and the first client device exceeding a specified threshold.

18. The system of claim 17, wherein the condition for executing the application at the fog network further comprises a determination that the fog network has sufficient resources to execute the application.

19. The system of claim 15, wherein the cloud environment is a Locator/Identifier Separation Protocol (LISP) network, wherein the mapping server is part of a LISP management server, wherein the endpoint identifier comprises an Internet Protocol (IP) address, and wherein the first locator identifier and the second locator identifier each comprise a routing locator (RLOC).

20. The system of claim 15, wherein determining from the mapping server that the endpoint identifier is mapped to the second locator identifier comprises:

transmitting a query from the fog network to the mapping server for a locator identifier associated with the endpoint identifier;

receiving, at the fog network, a response from the mapping server identifying the second locator identifier; and storing in the mapping cache at the fog network a second entry mapping the endpoint identifier to the second locator identifier.

* * * * *